US012461232B2

United States Patent
Herbertsson et al.

(10) Patent No.: US 12,461,232 B2
(45) Date of Patent: Nov. 4, 2025

(54) RADAR TRANSCEIVER

(71) Applicant: MAGNA ELECTRONICS SWEDEN AB, Vårgårda (SE)

(72) Inventors: Hans Herbertsson, Vårgårda (SE); Olof Eriksson, Vårgårda (SE); Mats Rydström, Vårgårda (SE)

(73) Assignee: MAGNA ELECTRONICS SWEDEN AB, Vårgårda (SE)

( * ) Notice: Subject to any disclaimer, the term of this patent is extended or adjusted under 35 U.S.C. 154(b) by 377 days.

(21) Appl. No.: 17/797,815

(22) PCT Filed: Feb. 9, 2021

(86) PCT No.: PCT/EP2021/053098
§ 371 (c)(1),
(2) Date: Aug. 5, 2022

(87) PCT Pub. No.: WO2021/160616
PCT Pub. Date: Aug. 19, 2021

(65) Prior Publication Data
US 2023/0040147 A1    Feb. 9, 2023

(30) Foreign Application Priority Data

Feb. 11, 2020  (EP) ..................... 20156602

(51) Int. Cl.
*G01S 13/931* (2020.01)
*G01S 7/00* (2006.01)
*G01S 7/02* (2006.01)

(52) U.S. Cl.
CPC ........... *G01S 13/931* (2013.01); *G01S 7/006* (2013.01); *G01S 7/023* (2013.01);
(Continued)

(58) Field of Classification Search
CPC ........ G01S 7/023; G01S 7/006; G01S 13/931; G01S 2013/9316; H04W 16/14;
(Continued)

(56) References Cited

U.S. PATENT DOCUMENTS 8,681,038 B1 *  3/2014  Noushin ................. G01S 7/292
                                              342/196
9,369,880 B2 *  6/2016  Choudhary ........... H04W 88/06
(Continued)

FOREIGN PATENT DOCUMENTS

EP          3244229 A1    11/2017
WO     2019/233830 A1    12/2019

OTHER PUBLICATIONS

International Search Report and Written Opinion of PCT/EP2021/053098 mailed Apr. 13, 2021.

*Primary Examiner* — Michael W Justice
(74) *Attorney, Agent, or Firm* — DICKINSON WRIGHT PLLC

(57) ABSTRACT

A method for operating a radar system (210) in a vehicle (201), the method including establishing a wireless communication link (245) to a radio base station (250) in a wireless communication network (260), requesting a time-frequency resource (420, 430) for communicating with a network node (270) via the radio base station (250), receiving a transmission grant from the radio base station (250) for communicating with the network node (270) using the time-frequency resource (420, 430), transmitting a communications signal (245) in the time-frequency resource, and transmitting a radar signal (235) in the time-frequency resource.

14 Claims, 5 Drawing Sheets

(52) U.S. Cl.
CPC ............. *G01S 2013/9316* (2020.01); *G01S 2013/93271* (2020.01); *G01S 2013/93272* (2020.01); *G01S 2013/93274* (2020.01)

(58) Field of Classification Search
CPC ........... H04W 4/40; H04W 4/42; H04W 4/44; H04W 4/46
USPC .................................. 342/70; 370/252, 329
See application file for complete search history.

(56) References Cited

U.S. PATENT DOCUMENTS

| | | | | |
|---|---|---|---|---|
| 9,557,413 | B2* | 1/2017 | Kozma | G01S 13/66 |
| 9,733,351 | B2* | 8/2017 | Kozma | G01S 13/56 |
| 10,419,944 | B2* | 9/2019 | Buchmayer | H04W 28/16 |
| 10,598,763 | B2* | 3/2020 | Kellum | H04B 7/086 |
| 10,741,088 | B1* | 8/2020 | Walker | H04W 4/022 |
| 10,908,771 | B2* | 2/2021 | Berquam | G06F 3/04815 |
| 10,955,547 | B2* | 3/2021 | Ray | G01S 7/003 |
| 11,039,400 | B2* | 6/2021 | Bolin | H04W 52/283 |
| 11,061,126 | B2* | 7/2021 | Ray | H04L 27/3863 |
| 11,125,854 | B2* | 9/2021 | Ray | G01S 13/825 |
| 11,617,088 | B2* | 3/2023 | Clark | H04W 16/04 370/329 |
| 11,626,911 | B2* | 4/2023 | Bengtsson | H04L 25/0204 375/267 |
| 12,108,439 | B2* | 10/2024 | Vejlgaard | H04W 74/0833 |
| 2008/0106458 | A1 | 5/2008 | Honda et al. | |
| 2013/0241764 | A1* | 9/2013 | Kozma | G01S 7/003 342/107 |
| 2013/0241765 | A1* | 9/2013 | Kozma | G01S 13/522 342/107 |
| 2015/0092675 | A1* | 4/2015 | Choudhary | H04W 88/06 370/329 |
| 2019/0132744 | A1* | 5/2019 | Buchmayer | H04W 24/02 |
| 2019/0293781 | A1 | 9/2019 | Bolin et al. | |
| 2019/0361113 | A1* | 11/2019 | Ray | H03D 3/009 |
| 2020/0036487 | A1* | 1/2020 | Hammond | H04L 5/0012 |
| 2020/0187126 | A1* | 6/2020 | Bolin | H04B 7/0695 |
| 2020/0249819 | A1* | 8/2020 | Berquam | G06T 19/006 |
| 2020/0309897 | A1* | 10/2020 | Ray | G01S 13/876 |
| 2020/0309933 | A1* | 10/2020 | Ray | G01S 13/282 |
| 2020/0373983 | A1* | 11/2020 | Bengtsson | H04B 7/088 |
| 2020/0396618 | A1* | 12/2020 | Clark | H04W 16/04 |
| 2021/0231771 | A1* | 7/2021 | Bengtsson | H04B 7/06966 |
| 2022/0330324 | A1* | 10/2022 | Vejlgaard | H04W 74/0833 |
| 2022/0407584 | A1* | 12/2022 | Nilsson | H04B 17/318 |

\* cited by examiner

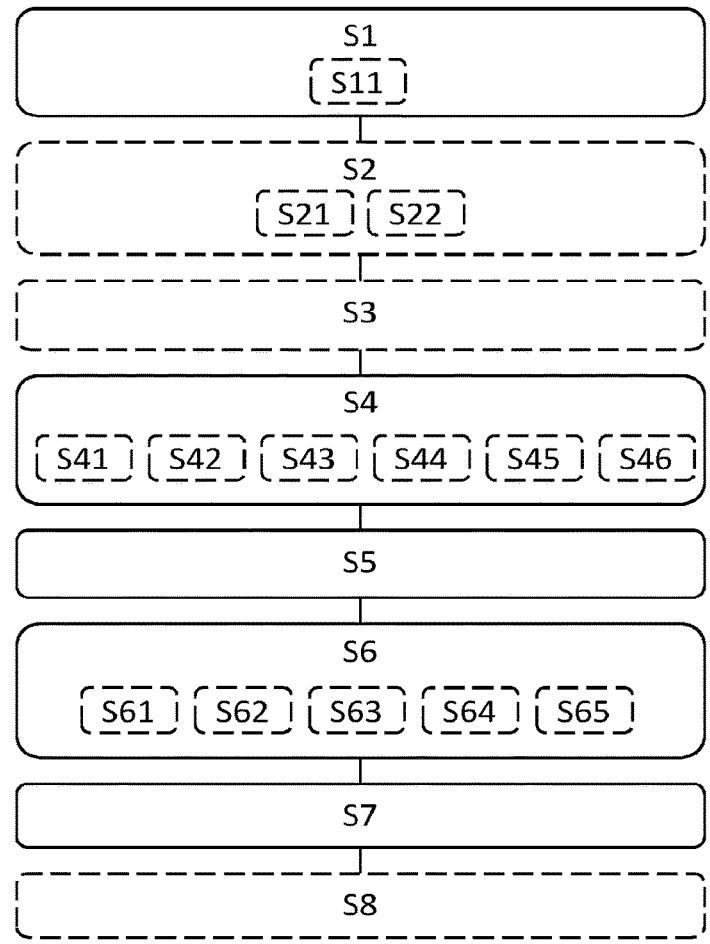
FIG. 9
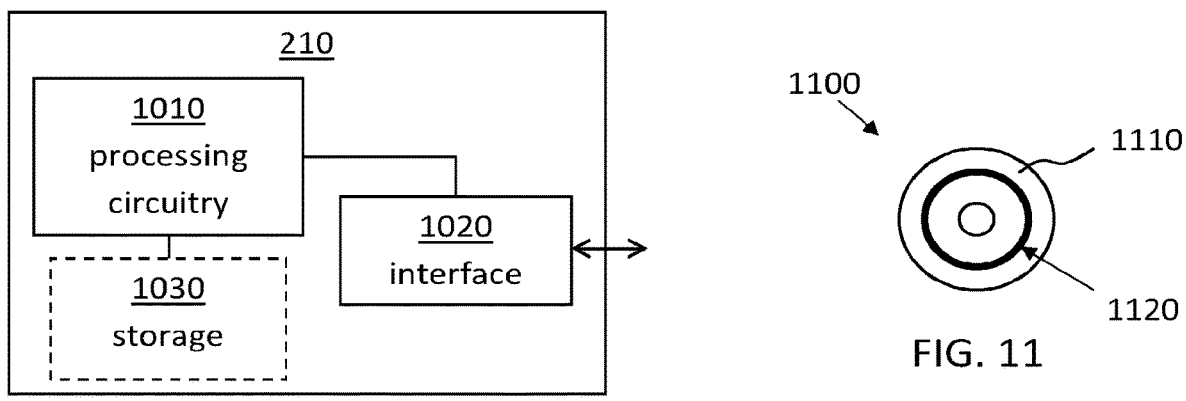
FIG. 10
FIG. 11

RADAR TRANSCEIVER

CROSS-REFERENCE TO RELATED APPLICATIONS

This application is a 35 U.S.C. § 371 national phase of PCT International Application No. PCT/EP2021/053098, filed Feb. 9, 2021, which claims the benefit of priority under 35 U.S.C. § 119 to European Patent Application No. 20156602.3, filed Feb. 11, 2020, the contents of which are incorporated herein by reference in their entirety.

FIELD OF THE INVENTION

The present disclosure relates to radar systems adapted for automotive applications. There are disclosed radar systems and methods for operating radar systems.

BACKGROUND

A radar transceiver is, normally, a device arranged for transmission and reception of radar signals in a dedicated radar frequency band. Radar transceivers are commonly used in vehicles for monitoring vehicle surroundings. Automatic Cruise Control (ACC) functions, Emergency Braking (EB) functions, Advanced Driver Assistance Systems (ADAS) and Autonomous Drive (AD) are some examples of applications where radar data represents an important source of information on which vehicle control is based.

Many of the dedicated automotive radar frequency bands allow uncoordinated transmission, which means that two or more radar transceivers may transmit at the same time in the same frequency band, and thus interfere with each other.

EP 3 244 229 A1 discussed the general effects of interference on a frequency modulated continuous wave (FMCW) radar system, and proposed methods to repair an interfered radar signal.

Despite the often impressive efficiency of previously proposed repair methods, there is a need for further improvements in vehicular radar systems in order to reduce interference.

As the number of radar transceivers in the traffic environment increases, spectral efficiency of the radar transmission system becomes an issue, since spectral resources are limited. There is a need for increased spectral efficiency in vehicular radar systems.

SUMMARY AND INTRODUCTORY DESCRIPTION OF EMBODIMENTS OF THE INVENTION

It is an object of the present disclosure to provide improved radar systems where interference is reduced or removed entirely, and where spectral efficiency is increased compared to known vehicular radar systems, such as uncoordinated automotive radar based on uncoordinated FMCW transmission. This object is obtained by a method for operating a radar system in a vehicle. The method comprises establishing a wireless communication link to a radio base station comprised in a wireless communication network and requesting at least one time-frequency resource for communicating with a network node via the radio base station. The method also comprises receiving at least one transmission grant from the radio base station for communicating with the network node using the time-frequency resource and transmitting a communications signal using the time-frequency resource. The method further comprises transmitting a radar signal using the time-frequency resource.

This way the radar operation is performed in parallel with the communication to the radio base station. The network is connected to the radar system and receives the communications signal just like it would have received a signal from any communications terminal connected to the network. The network need not be aware that the uplink transmission by the proposed system to the radio base station is used concurrently to provide a radar function. Since the wireless communication network issues a transmission grant for use of communications resources where interference levels are low, the radar system operation does not suffer from high interference levels, which is an advantage.

According to some aspects of the present disclosure, the method comprises transmitting the radar signal and the communications signal as the same radio signal. This means that the communication signal is re-purposed and used also for radar operation. The communications signal, as will be explained in the following, is normally quite well suited for use as a radar signal given its autocorrelation properties and normally also peak-to-average power ratio (PAPR) limitations imposed by the communications transceiver. The portion of the communications signal used for radar purposes can be transmitted in one direction to illuminate a single radar field of view (FoV), or it can be transmitted in several directions to illuminate a plurality of FoVs at the same time.

According to other aspects of the present disclosure, the method comprises transmitting the radar signal and the communications signal as different radio signals in separate radio beams and in different directions but during the same time period and in the same frequency band. This means that the transmission grant issued by the radio base station or by the communications network is used both for the communications signal, and also for a radar signal which uses a different waveform compared to the communications signal. The two different waveforms may, e.g., be two different orthogonal frequency division multiplex (OFDM) waveforms, or code division multiple access (CDMA) waveforms, of even an FMCW signal transmitted in the same frequency band and time slot indicated by the transmission grant, but in a different direction compared to the direction from the radar system to the radio base system.

According to aspects of the present disclosure, the different radio signals transmitted in separate radio beams and in different directions comprise at least one synchronized pilot signal. This synchronized pilot signal is used, e.g., by the radio base station to maintain the connection to the radar system. In some systems, this pilot signal may be necessary for maintaining the link between radar system and the radio base station. The pilot signal can be inserted or interleaved in a legacy format radar transmission signal such as an FMCW radar transmission format. This way the connection to the radio base station can be maintained even if no actual communication signal data is transmitted as payload to the radio base station.

According to aspects of the present disclosure, the method comprises obtaining a request from a target tracking function comprising a desired bandwidth and requesting the time-frequency resource based the desired bandwidth. This means that only a bandwidth desired by the tracking function is used for radar transmission and not the full bandwidth capability of the radar transceiver at all times, thereby improving spectral efficiency of the radar operation and allowing the un-used bandwidth to be used by other radar systems instead.

According to aspects of the present disclosure, the method comprises obtaining a request from a target tracking function comprising a desired transmission time duration and requesting the time-frequency resource based on the desired transmission time duration. The transmission time period affects transmitted signal energy, which in turn has an effect on the range of the radar system. By only using as long transmission time durations as required by the target tracking function, spectral efficiency is improved, and consumed energy by the radar system is also conserved.

According to aspects of the present disclosure, the method comprises obtaining a scheduling priority value from a target tracking function, wherein the requesting comprises requesting a time-frequency resource with the priority value. Sometimes the target tracking function urgently needs information related to some traffic scenario or detected object, and sometimes data is not required with the same urgency. By communicating a priority value to the network, the scheduling function may differentiate between urgent high priority "need to have" requests and "good to have" requests which need to be immediately accommodated by the scheduling function. The priority value may be associated with a quality of service (QoS) function implemented in the communications network.

According to aspects of the present disclosure, the requesting comprises requesting a time-frequency resource associated with a delay constraint. By associating the request with a delay constraint, the scheduling function is allowed more freedom in allocating the requested time-frequency resources. Some requests may be very urgent, such as if a possible collision between vehicles is imminent, in which case the delay constraint can be set very strictly, while other requests such as ACC function updates may be less urgent and can be associated with a more relaxed time constraint.

According to aspects of the present disclosure, the requesting comprises requesting a time-frequency resource comprised in a Physical uplink shared channel, PUSCH, of a fifth generation, 5G, cellular communications system. The herein disclosed techniques are particularly suitable for implementation in a 3GPP-defined network, such as the 5th generation cellular networks discussed in, e.g., 3GPP TS 36.400 V15.8.0 and also future releases by the 3GPP. These networks are specified on a global basis, which is an advantage, since vehicle radar systems can be delivered world-wide without major modification.

According to aspects of the present disclosure, the requesting comprises specifying one or more frequency bands associated with the request. The herein disclosed techniques are not limited to single band operation. On the contrary, the techniques are well suited to multi-band operation where the radar system may even select frequency band depending on operating scenario and traffic environment. More than one frequency band may be used for radar and communications operation simultaneously.

According to aspects of the present disclosure, the method also comprises identifying the radar system as comprising a radar transceiver when establishing the connection to the radio base station. This means that the network and/or the radio base station can adapt its operation to the fact that the connected terminal is in fact a radar system. For instance, interference from neighboring cells can be accounted for in the scheduling of communications resources in order to further reduce interference experienced by the radar system and by other terminals in the network.

According to aspects of the present disclosure, the method comprises generating dummy data for transmitting the communications signal. For instance, in case no information is available in, e.g., a transmission buffer, for transmission on the uplink to the radio base station, then the radar system may generate dummy data using, e.g., a pseudo-noise sequence or the like. The system may also insert a legacy radar signal such as an FMCW signal in between pilot symbols of an OFDM-based network communications signal.

According to aspects, the method comprises associating a reported target detection with the transmission grant data. This allows, e.g., a target tracking function to adjust its operation depending on the properties of the radar operation at the time of generating the target detection. For instance, the radar operation range and resolution will vary in dependence of the transmission grants obtained over time.

According to aspects, the method comprises requesting a plurality of time-frequency resources for communicating with the network node via the radio base station and transmitting a corresponding plurality of radar signals in the plurality of time-frequency resources. This particular feature is suitable in case a vehicle comprises a plurality of radars covering different fields of view, and where the different radars are prone to interfere with each other. In this way each radar receives its own transmission grant associated with separate transmission resources in terms of either time, frequency, or both time and frequency, and may therefore operate without interference from the other on-board radar transceivers of the vehicle.

There are also disclosed herein vehicles and radar systems associated with the above-mentioned advantages.

The vehicles and radar systems disclosed herein are associated with the same advantages as discussed above in connection to the different methods.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present disclosure will become apparent when studying the appended claims and the following description. The skilled person realizes that different features of the present disclosure may be combined to create embodiments other than those described in the following, without departing from the scope of the present disclosure.

BRIEF DESCRIPTION OF THE DRAWINGS

The present disclosure will now be described in more detail with reference to the appended drawings, where FIG. 1 schematically illustrates a traffic scenario;
FIG. 9 is a flow chart illustrating methods;
FIG. 10 schematically illustrates a radar system;
FIG. 11 shows an example computer program product.

DETAILED DESCRIPTION OF EMBODIMENTS OF THE PRESENT INVENTION

Figure 1:
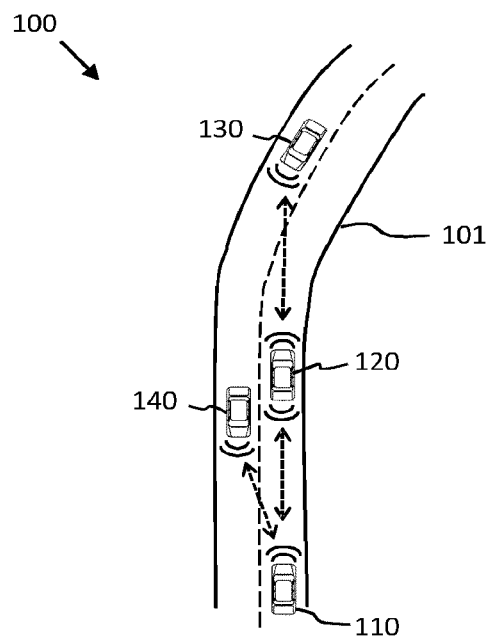

Aspects of the present disclosure will now be described more fully with reference to the accompanying drawings.

The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the disclosure. As used herein, the singular forms "a", "an" and "the" are intended to include the plural forms as well, unless the context clearly indicates otherwise.

FIG. 1 shows a traffic scenario 100 where vehicles 110, 120, 130, 140 travel on a road 101. Each vehicle comprises one or more radar transceivers. The radar transceivers operate in a dedicated radar frequency band, such as the 76-77 GHz frequency band available for vehicular long-range radar applications. This band has the benefit of high allowed equivalent isotropic radiated power (EIRP), which enables front long-range radar applications like adaptive cruise control. However, transmission in this band is uncoordinated, which means that radars may unknowingly interfere with each other.

In FIG. 1, the front radars of vehicle 120 and vehicle 130 may generate severe interference to each other, as well as the front radars of vehicle 110 and vehicle 140. Vehicle 120 also comprises a rearward looking radar which may interfere with, e.g., the front radar of vehicle 110.

The effects of this interference on vehicle systems such as ACC and AD may be alleviated to some degree by the type of repair methods discussed in EP 3 244 229 A1. However, there is a limit to how much interference that can be handled by such repair-based methods.

An objective of the present disclosure is to present a radar system which is interference free, or where interference is at least significantly reduced. This is achieved by merging the radar operation with a communications operation involving a wireless communication network. The communications network inherently provides a scheduling and resource assignment function, which can be exploited also for the radar operation.

The 76-77 GHz band is available for radar operation, but the band is shared among the radar transceivers. As the number of radar transceivers in the traffic infrastructure increases, this band is likely to become more and more occupied. Even if some form of transmission coordination is implemented in automotive radar frequency bands, there is a limit to how many radar transceivers that can co-exist in the limited spectral resources which are available. It is therefore questionable if every radar transceiver should use its maximum bandwidth and duty cycle at all times, since such transmission may consume an unnecessarily large amount of time-frequency resources.

Spectral resources for radar operation are becoming more and scarcer as the number of radar transceivers increase. Spectral efficiency therefore becomes an issue. Most radar system today are relatively inefficient when it comes to spectral efficiency. A normal FMCW radar system for instance normally sweeps with a constant repetition time period, or duty cycle, even if no targets of interest for the control of the vehicle are near. The bandwidth used for each radar transmission is also normally constant, even if the current traffic scenario does not require high resolution radar imaging for safely controlling the vehicle. This way of operating a radar transceiver is inefficient from a spectral point of view.

Another objective of the present disclosure is to describe a method and a radar system where the time-frequency resources used by a given radar transceiver are adapted according to need. This way a radar transceiver only uses as much resources as it requires to fulfil the task at hand. For instance, if no targets are nearby, then perhaps the transmission repetition interval can be extended somewhat without jeopardizing vehicle control. Also, if only far away targets are detected, then a single radar transmission at high bandwidth may be sufficient for classifying the far away target or targets, and a reduced bandwidth radar transmission can be used in-between high bandwidth transmissions to keep track of, i.e., monitor, the far away object or objects.

The radar systems disclosed herein mimic the operations of a communications network terminal, such as a fourth generation (4G) or fifth generation (5G) 3rd Generation Partnership Project (3GPP) wireless device. The radar system connects to the communications network where it authenticates itself as a communications terminal. The radar system then requests time-frequency resources for uplink (UL) communication just like any terminal would do in case it needs to transmit some data to a server or to another terminal in the network. The network responds by allocating the requested communications resources to the radar system, which means that the radar system obtains permission to use certain frequency slots during certain time periods. The radar system then transmits data to the network using the communications resources. However, the radar system also transmits a radio signal using the same communications resources to illuminate a radar field of view (FoV). This signal then generates backscatter which the radar system detects by means of, e.g., cross correlation with the transmitted radio signal. Targets in the field of view are thereby detected just like in a normal radar system, but this detection is not subject to interference due to the scheduling performed by the communications network. It is appreciated that some interference may still result from radar systems operating in neighboring cells, at least in case they are scheduled independently from the radar systems in the present cell. To reduce this "co-cell" radar interference, a scheduling method can be implemented which accounts for radar transceivers also on the cell edge of neighboring cells, or over some area wherein the radar system 210 is currently located. This scheduler could even account for transmission directions and global positions of the various radar transceivers on the vehicle and schedule radar systems jointly over more than one cell in dependence of transmission direction in order to reduce this co-cell radar interference.

The radial velocity of targets can be determined based on a series of consecutive radar detections in a known manner. Direction of arrival, i.e., target bearing, can be determined in case the radar receiver comprises an antenna array, again just like a legacy radar system.

The transmitted data can be almost any type of data, since the fundamental radar function is not dependent on the exact information transmitted to the network. The communication data is normally constructed in a way to actually achieve a reasonable "average" power without, e.g., spurious emission components, and these properties are desired in a radar signal as well. The radar performance depends to a large degree on the autocorrelation properties of the transmitted signal, and most data transmissions are associated with the desired autocorrelation properties.

The radar system may optionally request resources from the communications network when needed. For instance, in case the radar system needs to check if a target is actually two objects located close together, then larger bandwidth resources may be requested compared to normal operation. Also, if the radar system needs to detect targets far away, or smaller targets associated with reduced radar cross section (RCS), then a transmission resource with extended time duration can be requested in order to increase transmitted energy and thereby improve on signal to noise ratio (SNR).

A further objective of the present disclosure relates to establishing a control link to a communications network allowing fast set-up of higher bandwidth connections when need arises. The control connection can, e.g., be set up in a 3GPP 4G spectrum at 2.8 GHz, and the high bandwidth connection set up at higher carrier frequency bands, such as 26 GHz or higher. This way the radar system can maintain connection to the network during periods of time where interference in the dedicated automotive frequency bands is low, permitting use of legacy FMCW-based radar systems for vehicle control, perhaps complemented by the type of repair methods described in EP 3 244 229 A1. However, requests for scheduled (interference free) radar transmission can quickly be dispatched to the network scheduler via the control channel if the need arises.

Figure 2:
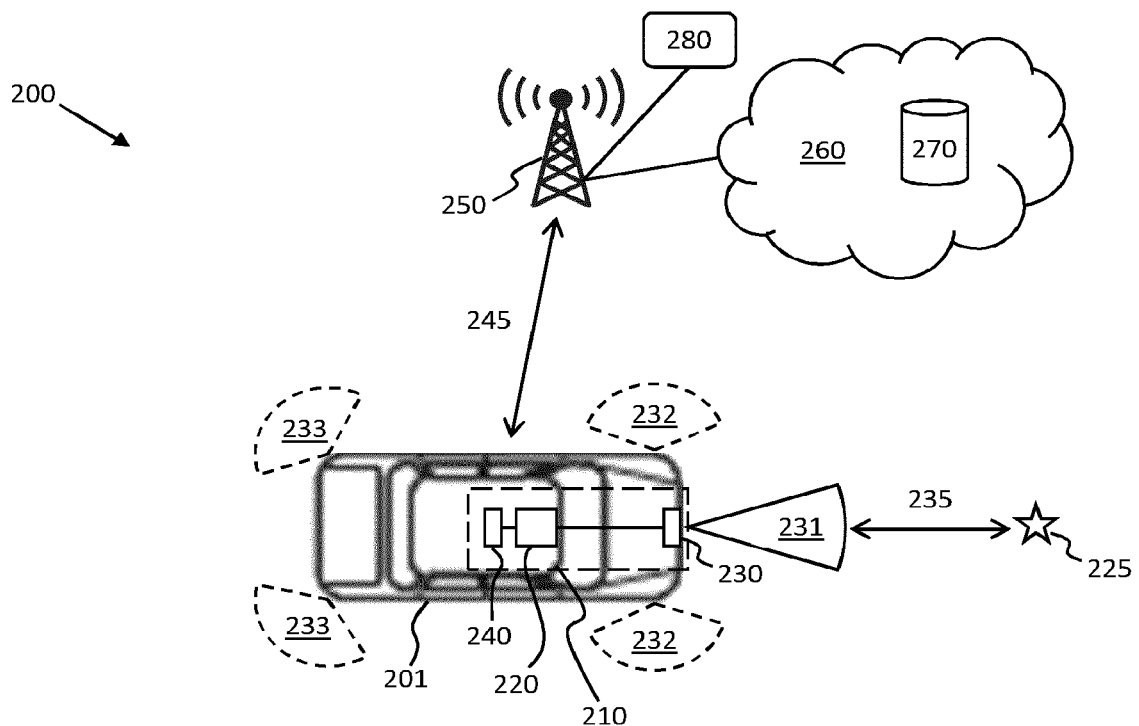
FIG. 2 shows an example vehicle radar system.

FIG. 2 schematically illustrates the proposed vehicle radar concept 200. A vehicle 201 comprises a radar system 210. The radar system is associated with at least one field of view 231, 232, 233. A front radar is associated with a field of view 231 extending in front of the vehicle, and normally to a range of about 150-200 m. The radar system 210 may optionally also comprise more short range side radars with fields of view 232 extending laterally to the sides of the vehicle 201 and also rearward looking radars associated with fields of view 233 covering areas to the rear of the vehicle. A typical range of a corner radar or rearward looking radar may be on the order of 80 meter or so.

The different fields of view are serviced by respective radar antennas. Radar antennas are normally directive, meaning that the transmitted radar energy is focused in some direction. The directivity may be achieved by, e.g., antenna arrays. The antennas may be fed by separate radar transceivers or fed from a single central radar transceiver. In the example shown in FIG. 2, a separate radar transceiver 230 is used to feed a radar signal to illuminate the forward field of view 231. The radar transmission 235 is reflected or scattered by a target 225, which is then detected by the radar transceiver 230.

The radar transceiver 230 is connected to a central control unit 220 which controls the radar transceiver. This control may comprise transmission timing, transmission frequency content, as well as the actual transmitted time waveform.

The control unit 220 is also connected to a communications transceiver 240. This communications transceiver is arranged to establish a wireless communication link 245 to a radio base station (RBS) 250 or other wireless access point. This RBS is part of a wireless communication network 260 comprising one or more nodes and/or servers 270 to which a communication link can be established. The wireless communication network comprises a scheduler 280 which manages the wireless communications resources of the wireless access network. This scheduler can be comprised in the RBS or located elsewhere in the network infrastructure.

A wireless terminal, such as the communications transceiver 240, establishes a connection to the network. The initial access procedure depends on the type of communications network used. For a 4G or 5G 3GPP-based network, the initial access involves communication over the uplink physical random access channel (PRACH). Once the wireless terminal is connected to the network, it may request communications resources for communicating on the uplink to the RBS. The scheduler 280 assigns time-frequency resources to the wireless terminals in dependence of, e.g., channel quality and user priority. Details of this procedure are given in, e.g., 3GPP TS 36.400 version 15.8.0.

The scheduler 280 is a key component for the achievement of a fast adjusted and efficiently utilized radio resource in the wireless communication network.

The Transmission Time Interval (TTI) in a 3GPP-based network is set to about 1 ms. During each TTI the RBS (or eNB/gNB as it is known in 3GPP 4G and 5G terminology) scheduler considers the physical radio environment for each wireless terminal connected to the RBS. The wireless terminals report their perceived radio quality, as an input to the scheduler to decide which Modulation and Coding scheme to use. The solution relies on rapid adaptation to channel variations, employing HARQ (Hybrid Automatic Repeat Request) with soft-combining and rate adaptation. The scheduler also prioritizes the quality of service (QoS) requirements amongst the wireless terminals. LTE (or 4G) supports both delay sensitive real-time services as well as datacom services requiring high data peak rates. The scheduler then informs the wireless terminals of allocated radio resources, i.e., on which time slots and frequency bins communication is allowed for a given wireless device. The RBS schedules the wireless devices both on the downlink (DL) and on the uplink (UL). For each wireless device scheduled in a TTI the user data will be carried in a Transport Block (TB). On DL there can be a maximum of two TBs generated per TTI per wireless device—if spatial multiplexing is used. The TB is delivered on a transport channel.

To achieve high radio spectral efficiency as well as enable efficient scheduling in both time and frequency domain, a multicarrier approach for multiple access was chosen by 3GPP. For the downlink, OFDMA (Orthogonal Frequency Division Multiple Access) was selected and for the uplink SC-FDMA (Single Carrier-Frequency Division Multiple Access) also known as DFT (Discrete Fourier Transform) spread OFDMA. These radio waveforms possess qualities which make them suitable for use also as radar signals. In particular, an SC-FDMA signal normally has a sharp autocorrelation function, allowing for detection of targets based on known radar detection techniques. For instance, a correlator receiver can be implemented which correlates a received signal with the transmitted signal in order to detect peaks in the correlator output. Each detected peak corresponds to a target 225. The phase of the correlator peaks can be compared over time in order to establish a radial velocity of the target 225 in a known manner.

The radar system 210 uses the communications transceiver 240 to connect to the RBS 250, and then requests communications resources. Once a transmission grant is obtained from the scheduler 280, the communications transceiver transmits data on UL to the RBS 250 according to the protocol specified for the given access technology of the RBS, see, e.g., section 5.2 in 3GPP TS 36.400 version 15.8.0 for an example. However, it also uses the transmission grant to send a signal in the same time period and in the same frequency band to illuminate one or more of the fields of view 231, 232, 233. The radar system then listens for reflected signal energy indicating presence of a target 225.

This way radar operation is enabled with significantly reduced interference levels, since the scheduler 280 only assigns transmission resources to a single transmitter at the time.

To summarize, with reference also to FIG. 9, there is disclosed herein a method for operating a radar system 210 in a vehicle 201. The method comprises establishing at step S1 a wireless communication link 245 to a radio base station, RBS, 250 comprised in a wireless communication network 260. The RBS may, e.g., be a gNB comprised in a 5G network or an eNB comprised in a 4G network, as defined by the 3GPP. The establishing may comprise performing a random access procedure according to known methods. For instance, in a 4G or 5G network, the random access procedure would follow a procedure similar to that outlined in 3GPP TS 36.400 version 15.8.0. For a vehicle, the establishing of the connection to the network may be performed when the vehicle is started and/or set in motion from a standstill. However, the establishing may also be performed as the vehicle enters an area with more dense traffic and more radar interference. Thus, a vehicle travelling on a country-side road with little or no other traffic may not need to perform the establishing, while a vehicle entering an urban area with dense traffic and many radar transceivers may perform the establishing in good time before radar interference or spectral efficiency becomes an issue.

The disclosed method comprises requesting at step S4 a time-frequency resource for communicating with a network node 270 via the radio base station 250. This time-frequency resource preferably comprises one or more resource blocks for transmission of an OFDM-based radio waveform to the radio base station, such as an SC-FDMA waveform exemplified in 3GPP TS 36.400 version 15.8.0.

It is appreciated that total transmission bandwidth may be expanded by aggregating two or more transmission frequency bands, possibly separated significantly in frequency. Thus, the requested time-frequency resource may be limited to contiguous frequency blocks or may comprise frequency blocks from more than one frequency band. In such cases, a lower carrier frequency band may be used for long range detection of targets at lower spatial resolution, while the higher carrier frequency band or bands (which are often wider bandwidth) can be used for more close range high spatial resolution radar operations.

The request may furthermore be for a single time period of transmission, or for a transmission schedule stretching over a longer period of time and defining more than one transmission operation. The transmission schedule may comprise a given duty cycle, i.e., a periodic schedule of recurring transmission or can be irregular. For instance, a radar system may request recurrent transmission resources at a given default bandwidth in order to monitor surroundings, where a less frequent transmission of higher bandwidth is interleaved in the transmission schedule in order to obtain snapshots of the surrounding of increased spatial resolution.

Figure 4:
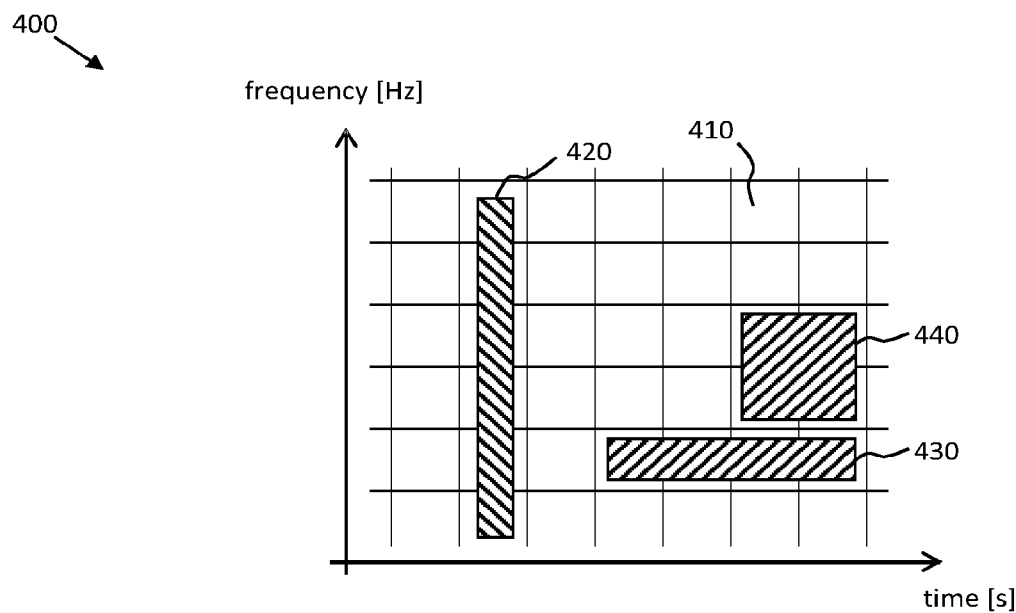
FIG. 4 shows an example radar system operation.

The disclosed method also comprises receiving at step S5 a transmission grant from the radio base station 250, or from the communications network, for communicating with the network node 270 using a time-frequency resource 420, 430 that is shown in FIG. 4. For a 3GPP-based network, this means that the scheduling function in the network has assigned transmission resources for use by the radar system in communicating with the radio base station on up-link. 3GPP TS 36.400 V15.8.0 discusses scheduling on uplink in Section 11. It is appreciated that the scheduling based on the request can be dynamic or semi-persistent. Thus, the vehicle radar system 210 may formulate its request to obtain a transmission schedule according to its current requirements, which requirements can be adapted to suit a given traffic scenario.

For example, a given vehicle may be capable of both ADAS functions (requiring manual drive) as well as autonomous drive operation (operating the vehicle without manual control). Then, depending on the mode of operation different transmission resources for radar operation may be requested from the network. An ACC function operating as driver support may not require as much transmission resources as a full autonomous drive operation operating without manual control of the vehicle. When the vehicle switches between modes, the requests for transmission resources sent from the radar system to the network will also change to reflect the requirements of the new mode.

The method further comprises transmitting at step S6 a communications signal 245 in the time-frequency resource and also transmitting at step S7 a radar signal 235 in the time-frequency resource. A radar signal is herein to be interpreted as a radio transmission used at least partly for radio detection and ranging purposes. Thus, as far as the present disclosure is concerned, there is no real difference between a radio signal used for communicating with a radio base station and a radio signal used for radio detection and ranging purposes. In fact, the general concept disclosed herein relies to a large extent on the realization that a communications signal can be used also as a radar signal, and by presenting the radar system to a communications network as a normal wireless device arranged for communication with the network interference free time-frequency resources can be obtain in which both communication and radar operation can be performed in parallel.

Figure 3:
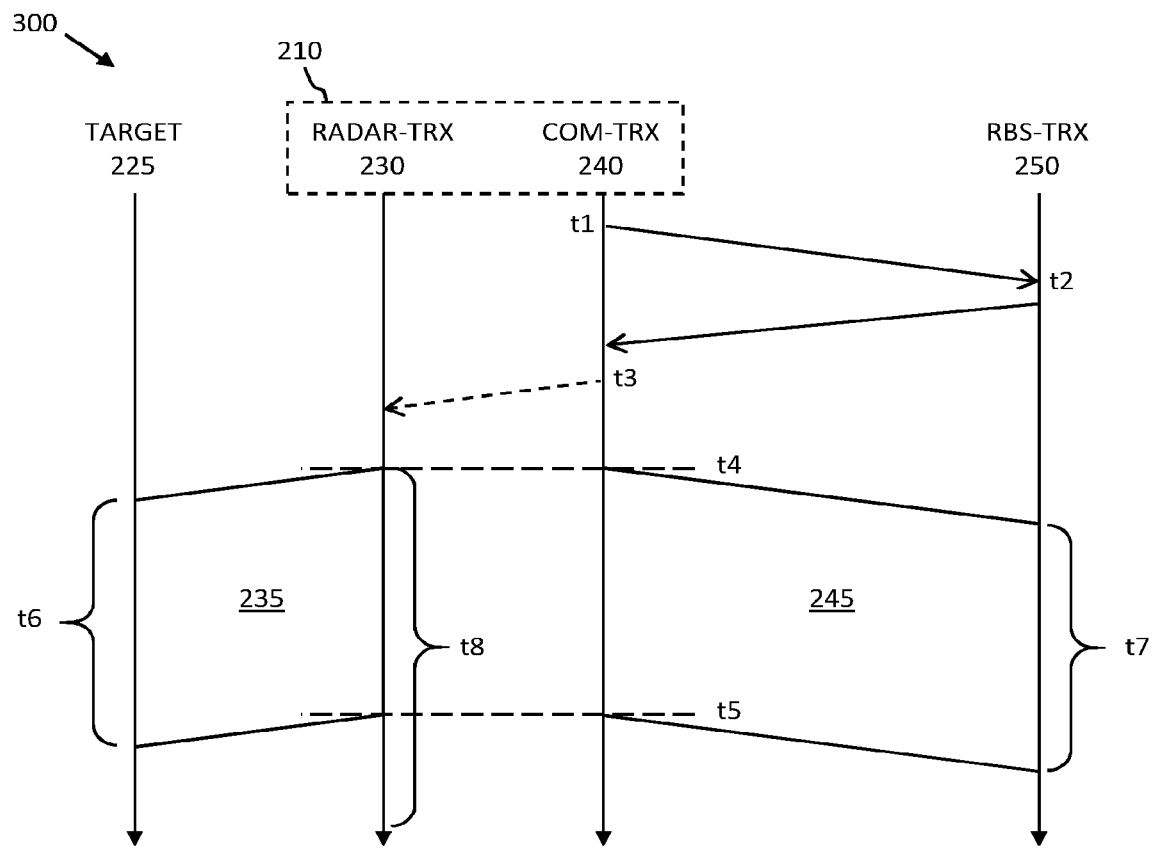
FIG. 3 illustrates example time-frequency resources.

The general concept is schematically illustrated in FIG. 3, which shows a signaling chart 300. The communications transceiver COM-TRX 240 establishes connection to the radio base station transceiver RBS-TRX 250 by sending a connect message at time t1. The RBS-TRX responds at time t2. The initial access procedure of course depends on the specifics of the communications network.

At a time t3, the COM-TRX optionally communicates with a radar transceiver RADAR-TRX 230 to, e.g., establish synchronization and prepare the RADAR-TRX for transmission. This is of course not necessary in case the COM-TRX and the RADAR-TRX are comprised in the same circuit.

At time t4 the COM-TRX transmits a signal on the uplink to the RBS-TRX. This signal is received by the RBS-TRX during time period t7 and is treated just like any communications signal received on the uplink in the given wireless access system. However, the proposed system also generates a radar transmission starting at time t4 which illuminates a target 225 during time period t6. This radar transmission 235 stops at the same time t5 as the communications transmission 245. The radar transceiver may listen for reflected signal energy coming from targets during a time period t8. This way, the RBS-TRX may treat the radar system just like any wireless device connecting to the network and making use of its time-frequency resources. However, further advantages may be obtained if the radar transceiver identifies itself as a radar system to the network, since it may then receive a differentiated service set tailored or radar operation from the network.

A subscription may be purchased by the radar system owner permitting connecting to the radio base station and requesting time-frequency resources for communication and radar operation.

According to some aspects, the method comprises transmitting at step S61 the radar signal 235 and the communications signal 245 as the same radio signal. This could for instance be the case if a central transceiver is used to generate a radio signal which is then distributed to different antenna units on the vehicle. On such unit may be configured to direct a transmission lobe towards the radio base station for transmission of the communications signal 245, while another such unit can be configured to transmit the radio signal 235 in a direction to illuminate a radar field of view 231 for radio detection and ranging purposes.

A similar operation could be realized in an architecture where separate but synchronized transmitters are used for transmission of the communications signal and for the radar signal. A number of different example hardware architectures for realizing parts of the discussed radar system 210 will be discussed below in connection to FIGS. 5-8.

Figure 12:
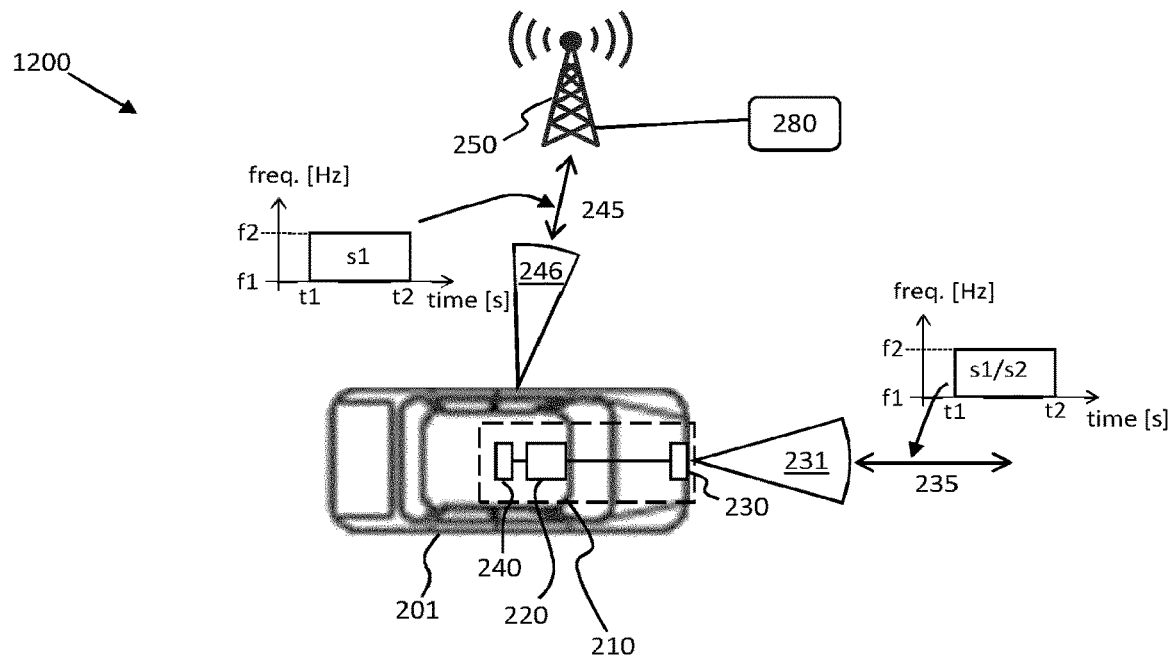
FIG. 12 shows an example vehicle radar system.

FIG. 12 illustrates an example vehicle radar system 1200 similar to that discussed in connection to FIG. 2. According to one option the exact same radio signal s1 is used both for the communications signal 245 to the radio base station 250 and for the radar signal 235 which illuminates the field of view 231. The radio signal s1 extends over a given frequency band or bands (from f1 to f2 in FIG. 12), and over some time duration or durations (from t1 to t2 in FIG. 12). This radio signal may, e.g., be an OFDM-based radio signal or it may be a spread spectrum like signal similar to those used in third generation communication systems.

According to another option the radar signal s2 235 used to illuminate the FoV 231 is different from the communications signal s1 245. This is possible at least if the communications signal s1 245 is directed in a narrow transmission lobe 246 towards the radio base station 250, which transmission lobe 245 is separated from the FoV 231 wherein which the signal s2 is strong.

According to some other aspects, the method comprises transmitting at step S62 the radar signal 235 and the communications signal 245 as different radio signals in separate radio beams and in different directions but during the same time period and in the same frequency band (or frequency bands if carrier aggregation is used). According to such aspects, the radar system uses the granted UL transmission resources or communication with the network just like any wireless device would. However, the radar system simultaneously re-uses the granted uplink transmission resources for transmission in at least one other direction where the transmission is used for radar operation. This way the radar system implements a form of frequency re-use since the same time-frequency resources are used in two ways by two different radio signals. This could potentially be complemented by a request for a stronger channel code and or more interference resilient modulation for the communications link 245, which would alleviate any self-interference generated from the radar transmission 235 on the communications transmission 245. The radar signal can be transmitted in more than one direction to cover multiple FoVs. Thus, the radar system may also implement a form of frequency re-use where the same time-frequency resources are used in a plurality of ways by a corresponding plurality of different radio signals.

Figure 13:
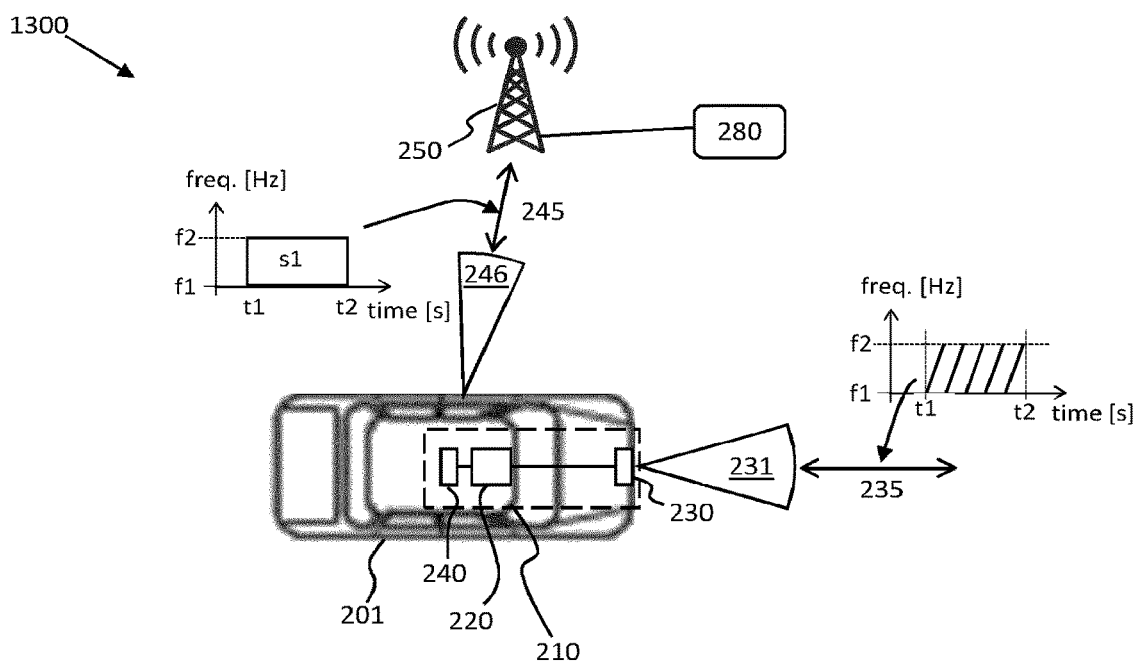
FIG. 13 shows another example vehicle radar system.

FIG. 13 illustrates an example radar system 1300 where the communications signal s1 245 is some type of wideband signal such as an OFDM-based signal or the like used for communicating with the radio base station 250. The radio signal s1 resides within a transmission grant over a frequency band from f1 to f2, and in a time slot extending from t1 to t2. At the same time a radar operation is obtained by transmission of a radar signal 235 in a FoV 231. The FoV 231 is separated from the transmission lobe 246 directed towards the radio base station. Here the radar signal is a legacy FMCW format signal. The advantage with this type of system is that a legacy FMCW radar system can be re-used, as long as it is configurable with a variable transmission time period and frequency band.

With reference to FIG. 13, it may be beneficial if the vehicle radar system 210 communicates its FMCW parameters such as frequency gradient and duty cycle to the radio base station 250 and/or to the communications network scheduler 280. The scheduler 280 and/or the radio base station 250 may then schedule two or more legacy FMCW transmitters in the same time frequency resource if the two or more transmitters comprise repair functionality such as that described in EP 3 244 229 A1. This repair functionality tends to be rather efficient at reducing interference between FMCW transmitters as long as a reasonable number of FMCW transmitters are active at the same time and in the same frequency band.

According to aspects of the present disclosure, the different radio signals transmitted S63 in separate radio beams and in different directions comprise at least one synchronized pilot signal. These pilot signals may be necessary in order for the radio base station to maintain connectivity. Examples of such pilot signals are given in, e.g., 3GPP TS 36.400 V15.8.0.

Aspects of the disclosed method also relate to the interaction between the radar operation and the higher layer processing functions in the vehicle. Such higher layer functions comprise, e.g., target tracking functions, sensor fusion algorithms, and vehicle control methods which make use of the data delivered from the radar system, i.e., lists of detected targets and the like. It is appreciated that such higher layer functions continuously monitor the surroundings of the vehicle in order to detect potential hazards and avoid dangerous situations while fulfilling the task of, e.g., maneuvering the vehicle according to some desired route. Such functions normally have a varying need for input form the radar system over time. In some driving scenarios there may be very few or no objects located close to the ego-vehicle. If this is the case, then most likely vehicle control decisions can be made without relying on detailed high resolution radar data. On the other hand, if the driving scenario is relatively complex with many close-by targets, then high resolution radar data may be necessary in order to safely control the vehicle and avoid collision with the nearby objects. Also, most modern vehicles rely on more than one type of sensor. For instance, the radar system may be complemented by vision-based sensors and/or lidar-based sensors. These sensors work well in under some conditions and not so well in other conditions. For instance, a vision-based sensor may be challenged by strong direct sunlight which temporarily blinds the sensor. Consequently, the need for high resolution radar data is likely to vary over time. For these reasons, the methods disclosed herein optionally comprises obtaining at step S21 a request from a target tracking function comprising a desired bandwidth, and requesting at step S31 the time-frequency resource 420, 430 based the desired bandwidth. This in turn means that spectral efficiency of the overall radar system is increased significantly since the radar system only transmits high bandwidth signals when necessary and uses lower bandwidth signals when the need to, e.g., resolve closely spaced targets is less pronounced.

For example, suppose a target tracking function is following two tracks which at some point in time come very close to each other and then appears as a single target track. The target tracking function may then associate two separate targets with the single track, and from time to time verify that this is indeed the case by illuminating the target with an increased bandwidth signal allowing the system to resolve the two closely spaced targets.

As another example, consider a new large target appearing for the first time in a detection list reported to a target tracking function. The target tracking function then often attempts to classify the new target in terms of, e.g., vehicle type and the like. An increase bandwidth radar transmission may be warranted in order to accurately characterize the target. Also, this high bandwidth initial transmission may even show that the new target is in fact two smaller targets located close together.

As yet another example, suppose the target tracking function is tracking an object located very close to the ego vehicle, and that a collision is not unlikely in the near future. The target tracking function may then request a continuous sequence of high bandwidth radar transmissions in order to accurately monitor the relative locations of the ego vehicle and the close-by object.

The methods disclosed herein optionally comprises obtaining at step S21 a request from a target tracking function comprising a desired transmission time duration, and requesting at step S41 the time-frequency resource 420, 430 based the desired transmission time duration. The transmission time duration has an effect on transmitted signal energy, which allows for increasing the detection range of the radar (since the signal to noise ratio increases). Similar to the variable need for transmission bandwidth by the radar system, the transmission time period can be adapted according to current driving scenario. In case the higher layer functions have little need for range, for instance if the driving scenario is a dense urban scenario with slowly moving traffic, then the transmission time periods requested from the network can be smaller compared to a freeway scenario where the vehicle is driving faster and may have need to see farther ahead in order to be able to respond to potentially hazardous situation in good time.

FIG. 4 illustrates a range 400 of time-frequency resources. Each block 410 amounts to a given time period of transmission in a certain frequency slot. The slots may, e.g., correspond to one or more resource blocks as discussed in 3GPP TS 36.400 V15.8.0. Some different transmission resource requests are exemplified in FIG. 4. A transmission grant indicates one or more time-frequency resources where transmission may take place, one transmission grant 420 extends over a wide frequency band and is therefore likely to result in radar operation at an increased spatial resolution. This type of transmission grant may be awarded to a radar system wishing to resolve two closely spaced targets, or which is in close proximity to some object. Another transmission grant 430 is on a smaller bandwidth, but over a longer time period. This transmission grant is likely to result in a reduced spatial resolution radar operation, but the range of the radar will not be significantly affected due to the prolonged transmission duration. One transmission grant 440 may be for some other radar system or for some normal wireless device which does not perform any radar operation. The network does not need to know which grant is for radar operation and which grant is for communications only. It is appreciated that the requested and/or granted transmission resources need not be contiguous in frequency nor in time.

According to other aspects, the method comprises obtaining at step S22 a scheduling priority value from a target tracking function or other higher layer vehicle function, wherein the requesting comprises requesting at step S42 a time-frequency resource 420, 430 with the priority value. This way the target tracking function may indicate a level of urgency or importance associated with the request for uplink transmission resources. This priority value then allows the scheduling function in the network to prioritize the radar system and assign the requested transmission resources more rapidly compared to a normal request for transmission resources. This mechanism is akin to a quality of service (QoS) mechanism implemented in many networks today.

Along these lines, the requesting may optionally also comprise requesting at step S43 a time-frequency resource 420, 430 associated with a delay constraint. This way a function such as a target tracking function may indicate to the network that it requires a high bandwidth transmission in order to, e.g., check if a detected target corresponds to one or more objects, within some time period or deadline. A vehicle control algorithm detecting a potentially hazardous situation may also place a strict deadline on its request for transmission resources. This allows the network to prioritize this radar system over other wireless devices connected to the radio base station.

As discussed above, the herein disclosed methods are suitable for use in a 3GPP defined network, such as discussed in 3GPP TS 36.400 V15.8.0 and related specifications. This means that aspects of the herein disclosed methods comprise requesting S44 a time-frequency resource 420, 430 comprised in a Physical uplink shared channel, PUSCH, of a fifth generation, 5G, cellular communications system.

The time-frequency resource 420, 430 requested by the radar system 210 may be limited to a single frequency band, to contiguous frequency slots, or to different bands. Thus, according to some aspects, the requesting comprises specifying S45 one or more frequency bands associated with the request. It is appreciated that different frequency bands have different propagation characteristics. For instance, lower frequency bands such as sub 7 GHz carrier frequency bands are normally associated with smaller propagation losses compared to higher carrier frequency bands such as band in vicinity of or above 80 GHz. On the other hand, the available frequency bandwidth at higher carrier frequency bands is normally larger compared to lower carrier frequency bands. The radar system may therefore formulate its request for uplink transmission resources in dependence of driving scenario. If long range is desired with no specific constraints on spatial resolution, then perhaps a lower carrier frequency bands can be requested, while if high bandwidth to resolve two closely spaced targets at close range then a higher carrier frequency ban may be desired.

Although the disclosed methods in part rely on the fact that the radar system operates transparently with respect to the radio base station, i.e., behaves just like any other wireless device connected to the network, there may be some instances where it could be beneficial to identify the radar system 210 to the radio base station. This could, for instance, be the case if high priority is required in order to resolve a potentially hazardous situation. The method therefore optionally comprises identifying S11 the radar system as comprising a radar transceiver when establishing the connection to the radio base station.

The communications link 245 between vehicle and radio base station 245 may carry any sort of data. Normally the vehicle has data to send on the uplink, in which case the uplink transmission resources can be used for conveying this data to a server 270 or to some other terminal. In fact, a lot of the vehicle to vehicle (V2V) or vehicle to infrastructure (V2I) data which is not associated with strict delay requirements may pass via the communication link 245. However, even if there is no useful data to transmit some data needs to be generated in order for the communications link to be kept up and running. For these reasons the method optionally comprises generating at step S64 dummy data for transmitting the communications signal 245. This dummy data can be generated, e.g., as a pseudo-random (PN) sequence, which would then comprise the desired autocorrelation properties allowing robust radio detection and ranging operation based on the same radio signal.

According to the discussions above, the radar system may request variable amounts of both bandwidth and time or its radar operation activities. This means that the performance of the radar system also will vary over time. The spatial resolution of the radar will be high when large bandwidth transmission grants are obtained, and smaller when more limited bandwidth resources are requested and granted by the network. The expected radar range will vary with the transmitted signal energy, which in turn varies with at least transmission duration. A tracking function or other vehicle control function may benefit from having access to this information. I.e., if a given target detection has been made with high or low spatial resolution, or if a radar object detection list has been made at limited radar range performance or not. The higher layer function may then adapt its operation depending on the properties of the data reported from the radar system and may proactively use this data to formulate future requests of transmission resources. Thus, for at least these reasons, the method optionally comprises associating S8 a reported target detection with the transmission grant data.

With reference to FIG. 2, a vehicle radar system may comprise more than one radar field of view 231, 232, 233. The herein disclosed methods may be used for more than one field of view by requesting at step S46 a plurality of time-frequency resources for communicating with the network node via the radio base station and transmitting at step S65 a corresponding plurality of radar signals in the plurality of time-frequency resources. This operation would also limit any self-interference experienced between different radar transceivers on the same vehicle, which is an advantage.

FIGS. 5-8 schematically illustrate example radar systems according to the present teachings. Each of the radar systems 500, 600, 700, 800 are arranged for use as a vehicle radar system. Each radar system comprises a communications transceiver 240, denoted COM-TRX in FIGS. 5-7, comprising a transmitter and a receiver arranged to establish the wireless communication link 245 to the radio base station 250 comprised in the wireless communication network 260, e.g., as exemplified in FIG. 2.

The COM-TRX is arranged to request one or more time-frequency resources 420, 430, 440 for communicating with a network node 270 via the radio base station 250, and to receive a transmission grant from the radio base station 250 for communicating with the network node 270 using the time-frequency resource 420, 430.

The COM-TRX is further arranged to transmit a communications signal 245 in the time-frequency resource. Thus, the network will see the radar system just like any wireless device connecting to the network and request transmission resources or transmission on an uplink to the radio base station.

However, the radar systems 210 disclosed herein further comprises a radar transceiver 230 comprising a transmitter and a receiver arranged to transmit a radar signal 235 in the time-frequency resource.

Figure 5:
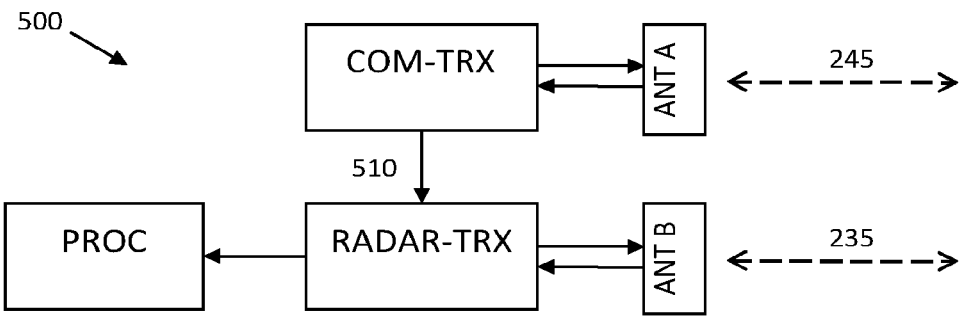
FIGS. 5-8 shows example radar system architectures.

This can be accomplished in a number of different ways. FIG. 5 shows an implementation where the COM-TRX and the RADAR-TRX are separate devices connected together by a synchronization interface 510. The RADAR-TRX then receives instructions and data from the COM-TRX indicating when to transmit and in which frequency slots (or frequency bands if the system permits multi-band operation). The radar detection data, comprising, e.g., an object detection list as discussed above, can then be forwarded to higher layer functions such as target tracking and the like. Such higher layer functions are indicated as PROC in FIGS. 5-8.

Figure 6:
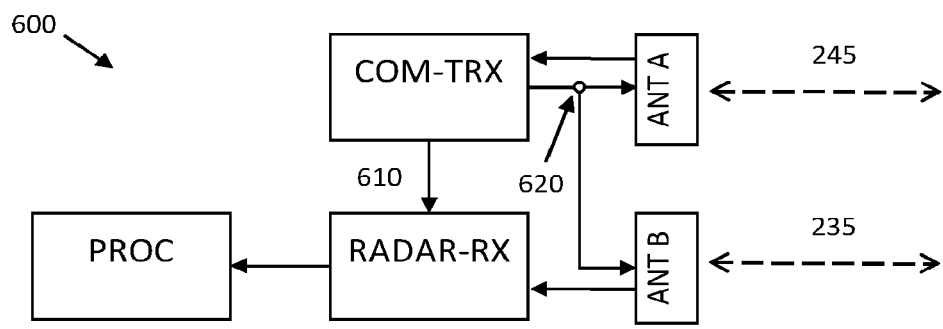

FIG. 6 schematically illustrates an implementation example wherein a shared transmitter constitutes both the communications transmitter 240 and the radar transmitter 230. A splitter 620 or the like is used to split the radio signal between a first antenna (ANT A) used for communicating with the radio base station, and a second antenna (ANT B) used for illuminating the radar field of view. The synchronization interface 610 is still present in order for the RADAR-TRX to know what has been transmitted and when, such that it known what reflection to listen or and to perform radar signal processing on.

Figure 7:
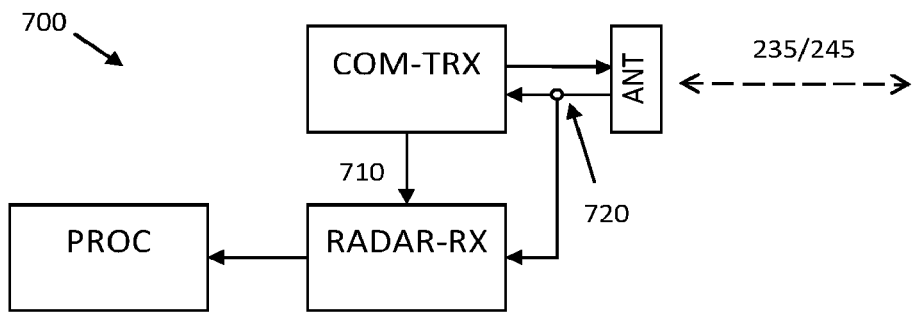

FIG. 7 shows another example where the communications receiver and the radar receiver (RADAR-RX) are separate receivers, and wherein a synchronization interface 710 connects the radar receiver to the communications transceiver. Here a single antenna is used for both communications and radar purposes, and part of the received signal is diverted 720 to the radar receiver.

Figure 8:
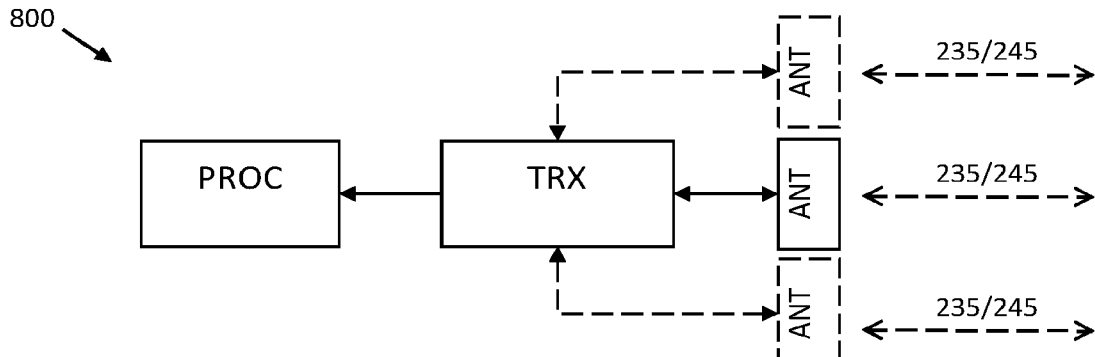

FIG. 8 illustrates a fully integrated solution 800 wherein a joint transceiver (TRX) performs both communications and radar functions using one or a plurality of antennas.

The radar detection function normally comprises a correlator function implemented in digital domain, however, according to some aspects, the proposed radar receiver comprises an analog correlator arranged in front of an analog to digital converter (ADC). This analog correlator suppresses interference prior to the ADC, thus lowering the ADC requirements considerably. The proposed radar receiver may implement an I/Q correlator. This means that each correlator output value is associated with a phase in addition to amplitude. By sampling the correlator output by a number of samples exactly corresponding to the number of range bins in an existing signal processing system for FMCW, a significant portion of the signal processing functionality for a legacy FMCW system can be re-used. A range-doppler map may for instance be created by stacking correlator output sample vectors and then computing a fast Fourier transform (FFT) across correlator vectors to obtain Doppler data. The result will be almost exactly that obtained from many existing FMCW radar front ends, so most if not all signal processing functionality can be re-used.

FIG. 10 schematically illustrates, in terms of a number of functional units, the components of the control unit 210 according to an embodiment. Processing circuitry 1010 is provided using any combination of one or more of a suitable central processing unit (CPU), multiprocessor, microcontroller, digital signal processor (DSP), dedicated hardware accelerator, etc., capable of executing software instructions stored in a computer program product, e.g. in the form of a storage medium 1030. The processing circuitry 1010 may further be provided as at least one application specific integrated circuit (ASIC), or field programmable gate array (FPGA).

Particularly, the processing circuitry 1010 is configured to cause the control unit 210 to perform a set of operations, or steps. These operations, or steps, were discussed above in connection to the various radar transceivers and methods. For example, the storage medium 1030 may store the set of operations, and the processing circuitry 1010 may be configured to retrieve the set of operations from the storage medium 1030 to cause the control unit 210 to perform the set of operations. The set of operations may be provided as a set of executable instructions. Thus, the processing circuitry 1010 is thereby arranged to execute methods and operations as herein disclosed.

The storage medium 1030 may also comprise persistent storage, which, for example, can be any single one or combination of magnetic memory, optical memory, solid state memory or even remotely mounted memory.

The control unit 210 may further comprise a communications interface 1020 for communications with at least one other unit. As such, the radar interface 1020 may comprise one or more transmitters and receivers, comprising analogue and digital components and a suitable number of ports for wired or wireless communication.

The processing circuitry 1010 is adapted to control the general operation of the control unit 210 e.g. by sending data and control signals to the external unit and the storage medium 1030, by receiving data and reports from the external unit, and by retrieving data and instructions from the storage medium 1030. Other components, as well as the related functionality, of the control unit 210 are omitted in order not to obscure the concepts presented herein.

FIG. 11 shows a computer program product 2010 comprising computer executable instructions 1120 arranged on a computer readable medium 1201 to execute any of the methods disclosed herein.

While the above description constitutes the preferred embodiment of the present invention, it will be appreciated that the invention is susceptible to modification, variation and change without departing from the proper scope and fair meaning of the accompanying claims.

The invention claimed is:

1. A method for operating a radar system in a vehicle, the method comprising the steps of:
    establishing a wireless communication link to a radio base station comprised in a wireless communication network,
    requesting at least one time-frequency resource for communicating with a network node via the radio base station,
    receiving at least one transmission grant from the radio base station for communicating with the network node using the time-frequency resource,
    transmitting a communications signal in the time-frequency resource,
    transmitting a radar signal in the time-frequency resource;
    obtaining a request from a target tracking function comprising a desired bandwidth for tracking or classifying an object using the radar system in the vehicle, and requesting the time-frequency resource based on the desired bandwidth.

2. The method according to claim 1, further comprising transmitting the radar signal and the communications signal as the same radio signal.

3. The method according to claim 1, further comprising transmitting the radar signal and the communications signal as different radio signals in separate radio beams and in different directions but during the same time period and in a same frequency band.

4. The method according to claim 3, wherein the different radio signals transmitted in separate of the radio beams and in the different directions comprise at least one synchronized pilot signal.

5. The method according to claim 1, further comprising obtaining a request from a target tracking function comprising a desired transmission time duration, and requesting the time-frequency resource based the desired transmission time duration.

6. The method according to claim 1, further comprising obtaining a scheduling priority value from a target tracking function, wherein the requesting comprises requesting the time-frequency resource with the priority value.

7. The method according to claim 1, wherein the requesting comprises requesting the time-frequency resource associated with a delay constraint.

8. The method according to claim 1, wherein the requesting comprises requesting a time-frequency resource comprised in one of a Physical uplink shared channel, a PUSCH communication system, a fifth generation communication system, a 5G communication system, or a cellular communications system.

9. The method according to claim 1, further comprising associating a reported target detection with the transmission grant data.

10. The method according to claim 1, further comprising requesting a plurality of the time-frequency resources for communicating with the network node via the radio base station, and transmitting a corresponding plurality of radar signals in the plurality of the time-frequency resources.

11. A radar system for a vehicle, comprising
    a communications transceiver comprising a transmitter and a receiver arranged to establish a wireless communication link to a radio base station comprised in a wireless communication network, to request a time-frequency resource for communicating with a network node via the radio base station, and to receive a transmission grant from the radio base station for communicating with the network node using the time-frequency resource,
    wherein the communications transceiver is arranged to transmit a communications signal in the time-frequency resource,
    wherein the radar system further comprises a radar transceiver comprising a transmitter and a receiver arranged to transmit a radar signal in the time-frequency resource, and
    wherein the radar system further comprises a target tracking function, and the radar system is arranged to obtain a request from the target tracking function comprising a desired bandwidth for tracking or classifying an object using the radar system in the vehicle, and requesting the time-frequency resource based the desired bandwidth.

12. The radar system according to claim 11, wherein a shared transmitter constitutes both the communications transmitter and the radar transmitter.

13. The radar system according to claim 11, wherein the communications receiver and the radar receiver are separate receivers, and wherein a synchronization interface connects the radar receiver to the communications transceiver.

14. A vehicle comprising the radar system according to claim 11.

* * * * *